United States Patent
Lewis et al.

(10) Patent No.: US 10,587,543 B2
(45) Date of Patent: Mar. 10, 2020

(54) OFFLINE CONTENT NOTIFICATION REMINDERS

(71) Applicant: Google Inc., Mountain View, CA (US)

(72) Inventors: Justin Lewis, Marina Del Rey, CA (US); Ruxandra Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 15/653,956

(22) Filed: Jul. 19, 2017

(65) Prior Publication Data
US 2019/0028413 A1 Jan. 24, 2019

(51) Int. Cl.
| H04L 12/58 | (2006.01) |
| H04L 29/08 | (2006.01) |
| G06F 16/00 | (2019.01) |
| G06Q 10/10 | (2012.01) |
| G06F 9/54 | (2006.01) |

(52) U.S. Cl.
CPC .............. H04L 51/06 (2013.01); G06F 9/542 (2013.01); G06F 16/00 (2019.01); G06Q 10/109 (2013.01); H04L 67/22 (2013.01); G06Q 10/107 (2013.01); H04L 51/24 (2013.01)

(58) Field of Classification Search
None
See application file for complete search history.

(56) References Cited

U.S. PATENT DOCUMENTS

| 8,754,765 B2 | 6/2014 | Berger et al. | |
| 9,325,653 B1* | 4/2016 | Peterson | H04L 51/24 |
| 2014/0253319 A1 | 9/2014 | Chang | |
| 2014/0273978 A1* | 9/2014 | Van Snellenberg | H04W 4/14 455/412.2 |

(Continued)

FOREIGN PATENT DOCUMENTS

| WO | 2017/030965 A1 | 2/2017 |
| WO | 2017/103798 A1 | 6/2017 |

OTHER PUBLICATIONS

International Search Report and Written Opinion dated Jul. 6, 2018, on application No. PCT/US2018/027649.

(Continued)

*Primary Examiner* — Cai Y Chen
(74) *Attorney, Agent, or Firm* — Lowenstein Sandler LLP

(57) ABSTRACT

Implementations disclose methods and systems for providing offline content notification reminders. A method includes downloading, via a network, a content item onto a user device; receiving, from a server device via the network, an offline reminder notification for the content item, a time frame for presenting the offline reminder notification, and a user engagement state threshold; placing the offline reminder notification for the content item in a notification queue; determining, at a time corresponding to the time frame, a user engagement state in relation to the content item; determining whether the user engagement state meets the user engagement state threshold; and in response to determining that the user engagement state does not meet the user engagement state threshold, presenting the offline reminder notification for the content item via the user device during the time frame, and removing the offline reminder notification from the notification queue.

20 Claims, 5 Drawing Sheets

(56) References Cited

U.S. PATENT DOCUMENTS

2017/0177423 A1    6/2017  Bradley et al.
2018/0013844 A1*   1/2018  Foged ................... H04L 51/32
2018/0321888 A1*  11/2018  Rosemann ............. G06F 3/121

OTHER PUBLICATIONS

A. Rehman "Identify & Uninstall Unused Android Apps with Useless Apps Remover" http://www.addictivetips.com/android/identify-uninstall-unused-android-apps-with-useless-apps-remover/ Nov. 1, 2012.

* cited by examiner

OFFLINE CONTENT NOTIFICATION REMINDERS

TECHNICAL FIELD

Aspects and implementations of the present disclosure relate to notifications and, in particular, content notification reminders.

BACKGROUND

Content items, such as applications, video items, audio items, etc., can be downloaded onto a user device. A user can engage with a content item via the user device. A user can also receive notifications via the user device for the content items.

SUMMARY

Aspects of the present disclosure improve notification technology by providing offline reminder notifications for content items that are accessible offline. The offline reminder notifications are presented by a user device (e.g., personal computer, smart phone, tablet, etc.).

BRIEF DESCRIPTION OF THE DRAWINGS

The present disclosure is illustrated by way of example, and not by way of limitation, in the figures of the accompanying drawings.

DETAILED DESCRIPTION

Figure 1:
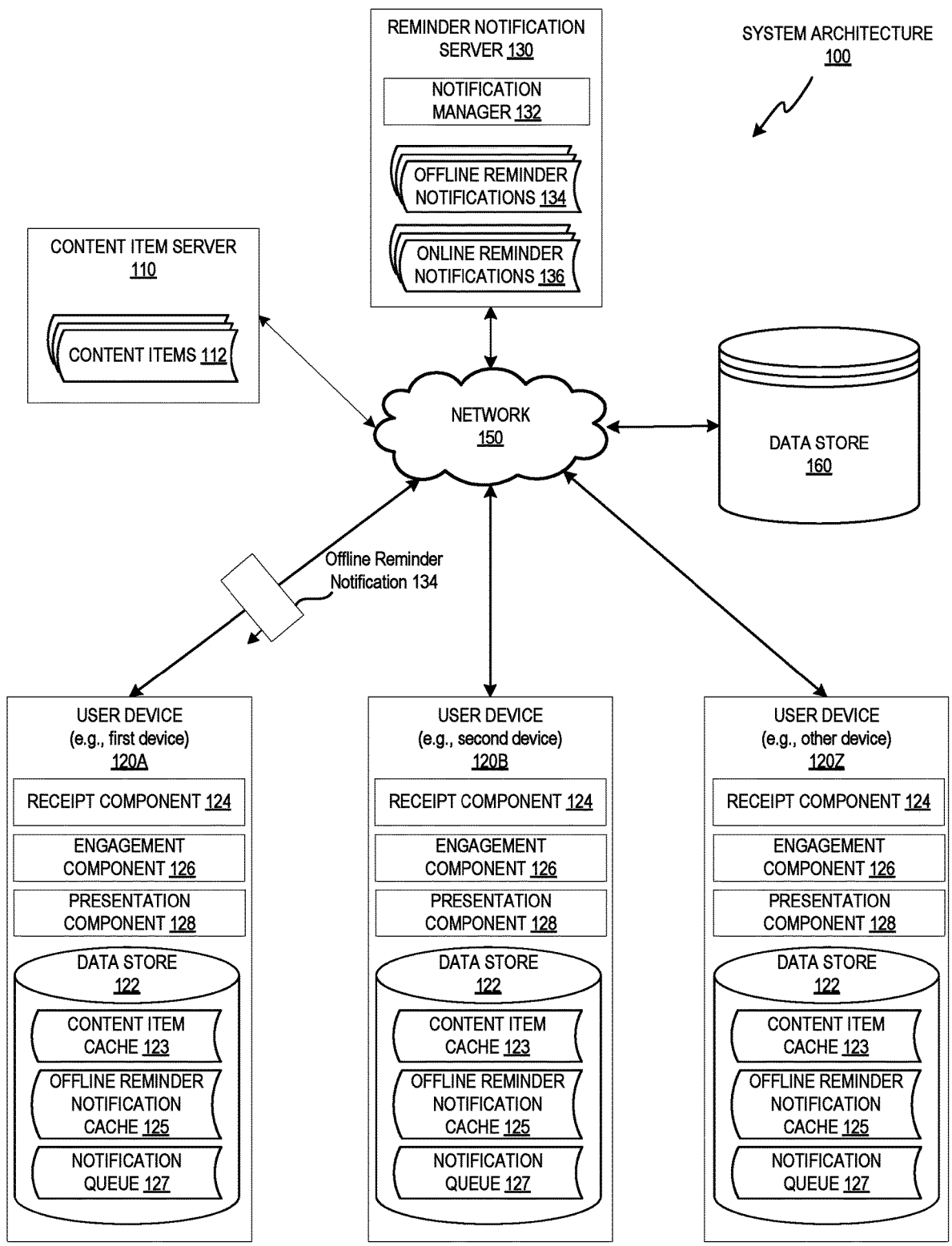
FIG. 1 is a block diagram illustrating an exemplary system architecture, in accordance with an implementation of the disclosure.

Aspects and implementations of the disclosure are directed to offline reminder notifications for content items. A content item, such as a video item, an audio item, an application, a contact invitation, a game, an advertisement, etc., may be downloaded onto a user device. The user may be able to access the content item via the user device when the user device is not connected to a network (e.g., content item is available offline). Some users may not engage with or may have low engagement with content items. For example, a user may not perform playback of an entire content item, a user may not access a content item for a threshold amount of time, or a user may not interact with a content item. Low user engagement with a content item may lead to a user losing interest in the content item (e.g., deletion of the content item, not downloading similar content items) and user dissatisfaction with a content hosting service providing the content item. Presenting notifications (e.g., prompts, social interactions, etc.) for a content item via a user device may increase user engagement with the content item.

When a user device is connected to a network (e.g., is online), the user device can receive an online notification for a content item via the network and present the online notification to the user. The online notifications for a content item may be competing with other online notifications (e.g., for content items of other content hosting services) for the attention of the user. An inappropriate amount or type of online notifications for a content item may not attract the attention of the user (e.g., may be drowned out by the other online notifications). An inappropriate amount or type of online notifications for a content item may cause a user to be annoyed with the notifications and to become dissatisfied with the content hosting service. A persistent network connection in order to receive online notifications also increases battery consumption of the user device.

If the network connection condition of the user device via the network does not meet a threshold (e.g., low available bandwidth, an expensive mobile data plan, etc.), downloading notifications may take more time or be more expensive than when the network connection condition meets the threshold. For example, downloading an online notification via a cellular network (e.g., a Long Term Evolution (LTE) network) may take more time or be more expensive than downloading via a wireless network (e.g., 802.11 network or a Wi-Fi network).

When a user device is not connected to a network (e.g., is offline), the user device typically does not receive online notifications via the network to display to the user. By not receiving online notifications, the user may not be encouraged to engage with content items.

Aspects of the present disclosure address the above-mentioned and other challenges by providing offline reminder notifications to a user via a user device. A user device may receive an offline reminder notification for a content item downloaded on the user device, a time frame for presenting the offline reminder notification, and a user engagement state threshold. A user engagement state threshold may refer to a predefined level of user interaction with a content item (e.g., watching at least 10 percent of the content item, accessing an installed application within a predefined time period, interacting with a connection invitation request, etc.).

At a time corresponding to the time frame, the user device may determine a user engagement state in relation to the content item. The user engagement state may refer, for example, to a current level of user interaction with the content item (e.g., a user watch time of the content item, a number of times the user opened an installed application, whether the user accepted a connection invitation request, etc.). The user device may determine whether the user engagement state meets the user engagement state threshold. If the user engagement state meets the user engagement state threshold, the user device may not present the offline reminder notification. Alternatively, if the user engagement state does not meet the user engagement state threshold, the user device may present the offline reminder notification via the user device during the time frame. In one implementation, the user device presents the offline reminder notification further in response to determining that, at the time corresponding to the time frame, the user device is not connected to a server device via the network or the user device has a network connection condition that does not meet a network connection condition threshold (e.g., there is not sufficient network bandwidth and/or a sufficient network connection speed). If the user device is connected to a server device via the network (e.g., and the network connection condition meets a network connection condition threshold), the user device may receive and display an online reminder notification.

Presenting an offline reminder notification for a content item, as disclosed herein, is advantageous because it is likely to increase user engagement with the content item. Presenting an offline reminder notification for a content item is also advantageous because the offline reminder notification may be presented to the user while the user is offline and therefore may not compete with online notifications. Presenting an offline reminder notification for a content item is also advantageous because the user device can receive the offline reminder notification from a server via an inexpensive network connection (e.g., a Wi-Fi network connection versus a cellular network connection) and can present the offline reminder notification to the user when the user device is not connected to the network or has a slow network connection. This improves overall user engagement with content items. In addition, aspects of the present disclosure result in significant reduction of required bandwidth, energy consumption (e.g., battery consumption), and latency because offline reminder notifications do not require that a user device maintain a persistent network connection to be able to receive online reminder notifications from a server and present such online reminder notifications to the user. Aspects of the present disclosure further result in reduction of computational (processing) resources because receiving the offline reminder notification at a first point in time and presenting the offline reminder notification at a second point of time when the user engagement with the user device is low (the user device is performing a small number of operations) allows for more efficient use of computing resources than receiving and presenting an online notification at the same point in time when the user engagement with the user device is high (the user device is performing a large number of operations).

FIG. 1 illustrates an example system architecture 100, in accordance with one implementation of the disclosure. The system architecture 100 includes content item server 110, user device 120, reminder notification server 130, a network 150, and a data store 160.

Content item server 110 may be one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The content item server 110 may be used to provide a user with access to content items 112. The content item server 110 may provide the content items 112 to the user (e.g., a user may select a content item 112 and download the content item 112 from the content item server 110 in response to requesting or purchasing the content item 112). Content item server 110 may be a part of a content item platform (e.g., a content hosting platform providing a content hosting service) that may allow users to consume, develop, upload, download, rate, share, search for, approve of ("like"), dislike, and/or comment on content items 112. The content item platform may also include a website (e.g., a webpage) or application back-end software that may be used to provide a user with access to the content items 112.

Content item server 110 may host content, such as content items 112. Content items 112 may be digital content chosen by a user, digital content made available by a user, digital content developed by a user, digital content uploaded by a user, digital content developed by a content provider (e.g., application developer), digital content uploaded by a content provider, digital content provided by the content item server 110, etc. Examples of content items 112 include, and are not limited to, mobile applications, smart television applications, desktop applications, software applications, video items (e.g., digital video, digital movies, etc.), audio items (e.g., digital music, digital audio books, etc.), games, advertisements, contact invitations (e.g., social network connection invitations), social media updates, digital photos, website content, social media updates, electronic books (eBooks), electronic magazines, digital newspapers, electronic journals, web blogs, real simple syndication (RSS) feeds, electronic comic books, etc.

Content items 112 may be consumed via a web browser on the user device 120 or via a mobile application ("app") that can be installed on the user device 120 via an app store. As used herein, "application," "mobile application," "smart television application," "desktop application," "software application," "digital content," "content," "content item," "video item," "audio item," "contact invitation," "game," and "advertisement" can include an electronic file that can be executed or loaded using software, firmware or hardware configured to present the content item 112 to an entity. In one implementation, the content item platform may store the content items 112 using the data store 160. Content items 112 may be presented to or downloaded by a user of user device 120 from content item server 110 (e.g., a content item platform such as a content hosting platform). According to aspects of the disclosure, content items 112 may allow users to interact with a prompt, watch content, make a purchase, participate in a conversation, etc. Content items 112 may be played via an embedded media player (as well as other components) provided by a content item platform or stored locally. The content item platform may be, for example, an application distribution platform, a content hosting platform, or a social networking platform, and may be used to provide a user with access to content items 112 or provide the content items 112 to the user. For example, the content item platform may allow a user to consume, upload, search for, approve of ("like"), dislike, and/or comment on content items 112. Content item server 110 may be part of the content item platform, be an independent system or be part of a different platform.

In some implementations, system architecture 100 may also include a reminder notification server 130 coupled to user device 120 via network 150 to facilitate providing reminder notifications to the user via the user device 120. In one implementation, reminder notification server 130 may be part of the content item platform. In another implementation, reminder notification server 130 may be an independent platform including one or more computing devices such as a rackmount server, a router computer, a server computer, a personal computer, a mainframe computer, a laptop computer, a tablet computer, a desktop computer, etc.

Reminder notification server 130 may include a notification manager 132. Notification manager 132 may transmit, to a user device 120, an offline reminder notification 134 for a content item 112, a time frame for presenting the offline reminder notification 134, and a user engagement state threshold. In some implementations, the notification manager 132 may receive a request from the user device 120 for an online reminder notification 136 (e.g., at a time corresponding to the time frame), identify an online reminder notification 136 for the content item 112 (e.g., identify an online reminder notification 136 that is an updated version of the offline reminder notification 134), and may transmit the online reminder notification 136 to the user device 120. The notification manager 132 may receive (e.g., from the user device 120) an indication that the user engagement state for a content item 112 meets the user engagement state threshold and may update transmittal of offline reminder notifications 134 and online reminder notifications 136 for the content item 112 (e.g., stop transmitting reminder notifications for the content item 112 to the user device 120, wait a threshold amount of time before transmitting reminder notifications for the content item 112 to the user device 120, etc.).

In some implementations, the data store 160 may store offline reminder notifications 134, corresponding time frames, corresponding user engagement state thresholds, and online reminder notifications 136.

User devices 120A, 120B, and 120Z (herein referred to as user device 120) may include computing devices such as personal computers (PCs), laptops, mobile phones, smart phones, tablet computers, netbook computers, network-connected televisions ("smart TV"), network-connected media players (e.g., Blu-ray player), a set-top-box, over-the-top (OTT) streaming devices, operator boxes, etc. User device 120 may be capable of receiving (e.g., downloading) content items 112 from content item server 110 over a network 150 and receiving offline reminder notifications 134 and online reminder notifications 136 from reminder notification server 130 over the network 150. User device 120 may execute content items 112 and present offline reminder notifications 134 independent of whether user device 120 is connected to the network 150 (e.g., while offline).

Network 150 may be a public network that provides user device 120 with access to content item server 110, reminder notification server 130, and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Each user device 120 may include an operating system that allows users to consume (e.g., present, play or execute) content items 112 and present notifications (e.g., offline reminder notifications 134, online reminder notifications 136). The content item 112 may be presented via a media viewer or a web browser. A web browser can access, retrieve, present, and/or navigate content (e.g., web pages such as Hyper Text Markup Language (HTML) pages, digital media items, text conversations, notifications, etc.) served by a web server. An embedded media player (e.g., a Flash® player or an HTML5 player) may be embedded in a web page (e.g., providing information about a product sold by an online merchant) or be part of a media viewer (a mobile app) installed on user device 120. In another example, the content item 112 may be a standalone application (e.g., a mobile application or app) that allows users to view digital media items (e.g., digital videos, digital images, electronic books, etc.), to participate in text conversations, and/or to receive prompts.

In the example shown in FIG. 1, user device 120 may include a receipt component 124, an engagement component 126, a presentation component 128, and a data store 122.

Receipt component 124 may receive an offline reminder notification 134 for a content item 112, a time frame for presenting the offline reminder notification, and a user engagement state threshold. The receipt component 124 may store the content item 112 in the content item cache 123 of the data store 122. The receipt component 124 may store the offline reminder notification 134 for the content item 112, a time frame for presenting the offline reminder notification, and a user engagement state threshold in the offline reminder notification cache 125 of the data store 122. The receipt component 124 may place the offline reminder notification 134 for the content item 112 in a notification queue 127 in the data store 122.

Engagement component 126 may determine (at a time corresponding to the time frame) a user engagement state (e.g., in relation to the content item 112, in relation to user engagement with the user device 120). The engagement component 126 may determine whether the user engagement state meets the user engagement state threshold. In some implementations, the engagement component 126 may determine whether the user device 120 is online (e.g., connected via the network 150 to the reminder notification server 130) or if the network connection condition of the user device 120 meets a network connection condition threshold. The network connection condition threshold corresponds to one or more predefined network connection characteristics (e.g., bandwidth, latency, speed, etc.) that allow for satisfactory exchange of data between user device 120 and other devices via network 150.

In some implementations, the presentation component 128 may present a notification (e.g., the offline reminder notification 134, online reminder notification 136) for the content item 112 via the user device 120 during the time frame and remove the offline reminder notification from the notification queue 127. In some implementations, the presentation component 128 may remove the offline reminder notification 134 from the notification queue 127 without presenting the offline reminder notification 134 for the content item 112 via the user device 120.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers).

In general, functions described in one implementation as being performed on the user device 120 can also be performed by the content item server 110 or reminder notification server 130 in other implementations, if appropriate. For example, the reminder notification server 130 may determine the network connection condition of the user device 120 via the network 150 at the time corresponding to the time frame and whether the network connection condition meets the network connection condition threshold. In another implementation, the content item server 110 may determine user engagement (e.g., current activity, online activity) of the user with the user device 120.

In addition, the functions of a particular component can be performed by different or multiple components operating together. The content item platform, content item server 110, and reminder notification server 130 can also be accessed as a service provided to other systems or devices through appropriate application programming interfaces (API), and thus is not limited to use in websites and applications.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user."

In another example, an automated consumer may be an automated ingestion pipeline of the application distribution platform.

Although implementations of the disclosure are discussed in terms of a content item server 110, reminder notification server 130, and a content item platform, implementations may also be generally applied to any type of social network providing content and connections between users.

In situations in which the systems discussed here collect personal information about users, or may make use of personal information, the users may be provided with an opportunity to control whether the application distribution platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content item platform and what user information is transmitted to the content item server 110 and reminder notification server 130.

Figure 2:
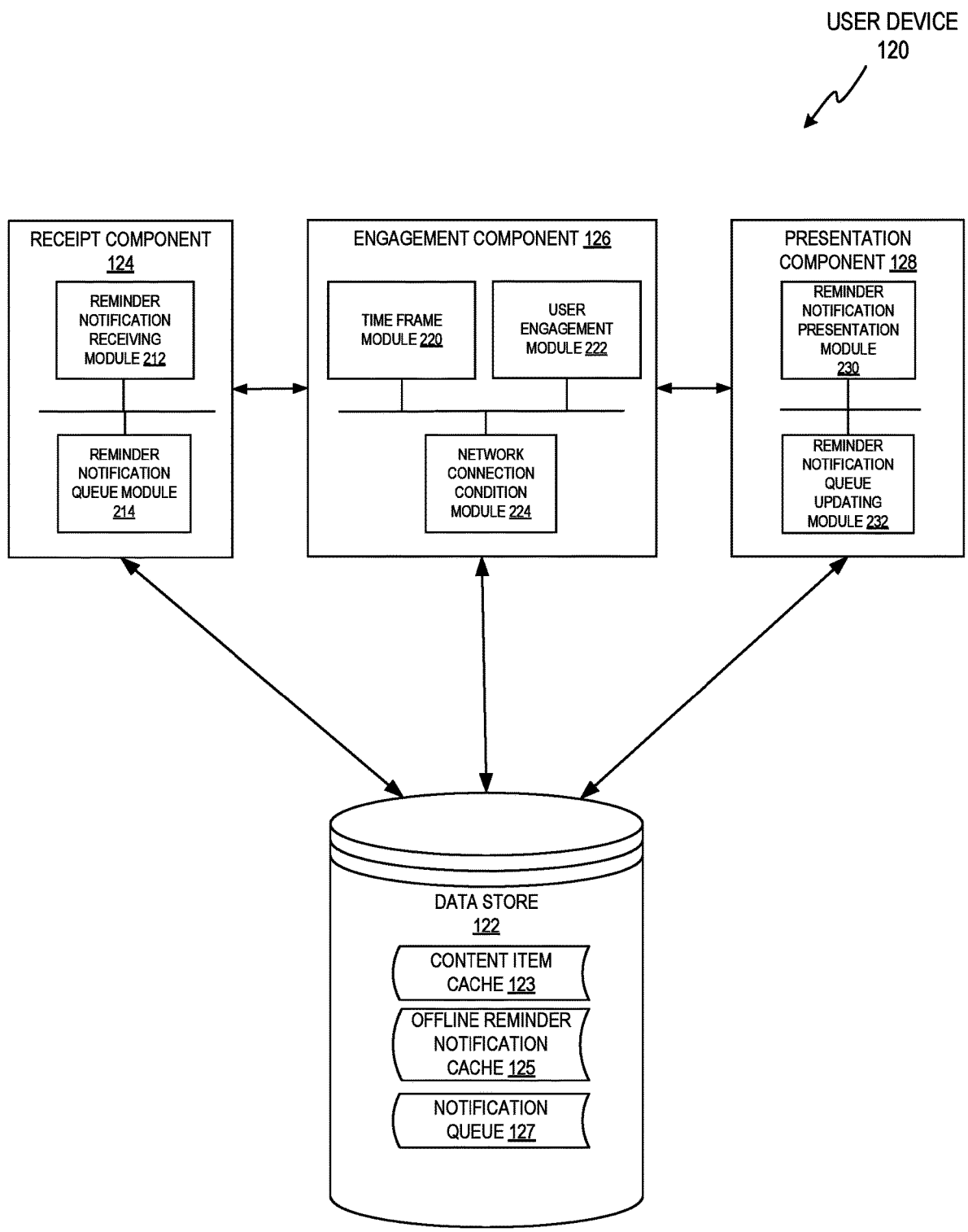
FIG. 2 is a block diagram illustrating the components and modules of a user device, in accordance with an implementation of the disclosure.

FIG. 2 is a block diagram illustrating the user device 120. In the example shown in FIG. 2, the user device 120 includes a receipt component 124, engagement component 126, and presentation component 128 coupled to the data store 122.

In some implementations, one or more of the receipt component 124, engagement component 126, and presentation component 128 are part of an application executing on the user device 120. For example, the application may host a content item 112 and the application may provide a reminder notification to engage with the content item 112 (e.g., listen to an offline mixtape). In another example, the application may be related to the content item 112 (e.g., the application is developed by the same application developer as the content item 112). In another example, the application may provide reminder notifications (e.g., prompts, advertisements) for content item 112 that is not related to the application.

In some implementations, one or more of the receipt component 124, engagement component 126, and presentation component 128 are part of a background thread (e.g., code that may be executed independently of the application, an open thread waiting for a specific event to occur or running a separate job). The user device may download an application (e.g., content item 112) from the content item server 110. Upon execution on the user device 120, the application may install a background thread on the user device that includes receipt component 124, engagement component 126, and presentation component 128. The background thread may execute regardless if the application is currently executing. The background thread may provide reminder notifications for one or multiple applications (e.g., applications from the same application developer).

The receipt component 124 includes a reminder notification receiving module 212 and a reminder notification queue module 214.

The user device 120 may download a content item 112 from the content item server 110. In some implementations, the content item server 110 is an application distribution server and the content item 112 is an application. In some implementations, the content item server 110 is a media item server and the content item 112 is a video or audio item. In some implementations, the content item server 110 is a social networking server and the content item 112 is a contact invitation (e.g., a friend request). In some implementations, the content item server 110 is a gaming server and the content item 112 is a video game. The user device 120 may store the content item 112 in the content item cache 123 of the data store 122. The content item 112 may be available offline (e.g., a user may engage with the content item 112 without user device 120 being connected via network 150 to the content item server 110). The user device may download the content item 112 via the receipt component 124.

The reminder notification receiving module 212 receives an offline reminder notification 134 for the content item 112, a time frame for presenting the offline reminder notification 134, and a user engagement state threshold. The offline reminder notification 134 may be a prompt to engage with the content item 112. In some implementations, the time frame includes a start time and an end time (e.g., Monday from 6:00 pm to 6:05 pm). In some implementations, the time frame is a reoccurring time frame (e.g., daily from 6:00 pm to 6:05 pm). In some implementations, the time frame is conditional. For example, the time frame could be from 6:00 pm to 6:05 pm or the first five minutes after the user device 120 is turned on if the user device 120 is turned off during part or all of 6:00 pm to 6:05 pm. In another example, the time frame could be from 6:00 pm to 6:05 pm or the first five minutes after user engagement with the user device 120 is below the user engagement state threshold if the user engagement with the user device 120 meets the user engagement state threshold from 6:00 pm to 6:05 pm.

The reminder notification queue module 214 places the offline reminder notification 134 for the content item 112 in a notification queue 127 (e.g., of data store 122). The notification queue 127 may include one or more offline reminder notifications and a corresponding time frame for presenting each of the offline reminder notifications. The notification queue 127 may include a reoccurring time frame for presenting one or more of the offline reminder notifications.

The engagement component 126 includes a time frame module 220, a user engagement module 222, and a network connection condition module 224.

The time frame module 220 determines the current time (e.g., accesses the current time being tracked by the user device 120). The time frame module 220 determines if an offline reminder notification 134 corresponds to the current time based on the time frame associated with the offline reminder notification 134. The time frame module 220 may access the offline reminder notification cache 125 or the notification queue 127 to determine whether an offline reminder notification corresponds to the current time.

The user engagement module 222 determines, at a time corresponding to the time frame, a user engagement state in relation to the content item 112. In some implementations, the time corresponding to the time frame may be a predefined interval (e.g., 5 seconds) before the time frame begins. In some implementations, the time corresponding to the time frame may be during the time frame. In some implementations, the time corresponding to the time frame may be a range of time (e.g., from before the time frame begins to a point in time during the time frame).

The user engagement state may include user engagement with the content item 112. In some implementations, user engagement with the content item 112 may include a percentage of the content item 112 that has been played by a user. In some implementations, user engagement may be an indication of the last time the user accessed the content item 112. In some implementations, user engagement may be whether the user interacted with the content item 112 (e.g., whether the user accepted, rejected, or discarded a contact invitation, etc.). In some implementations, the user engagement includes engagement by the user with the content item 112 via the user device 120. In some implementations, the user engagement includes engagement by the user with the content item 112 via any user device (e.g., via a user account corresponding to the user).

The user engagement state may include user engagement with the user device 120 (e.g., current activity via the user device 120). The user engagement module 222 may determine the user engagement with the user device 120 via a module or a plugin of the operating system of the user device 120. The user engagement module 222 may determine whether particular activities (e.g., via particular applications, etc.) are currently being executed. For example, the user engagement module 222 may determine whether user device 120 is currently outputting audio. In another example, the user engagement module 222 determines whether user device is currently performing playback of a content item 112 (e.g., a video or audio item). In another example, the user engagement module 222 determines whether user device 120 is currently using particular applications (e.g., a video conference application, a telephone application, etc.). In another example, the user engagement module 222 determines whether the user device 120 is in a setting that does not allow notifications (e.g., a "do not disturb" setting, etc.).

The user engagement module 222 may determine whether the user engagement state meets the user engagement state threshold. For example, the user engagement module 222 may determine whether a percentage of the content item 112 (e.g., a video or audio item) that has been played by a user of the user device meets a threshold percentage. In another example, the user engagement module 222 may determine whether the user accessed the content item 112 (e.g., an application) within a threshold amount of time. In another example, the user engagement module 222 determines whether the user has engaged with the content item 112 (e.g., contact invitation).

The network connection condition module 224 determines the network connection condition of the user device 120 via the network 150 at the time corresponding to the time frame. In some implementations, the network connection condition module 224 determines whether the user device 120 is online (e.g., is connected via the network 150 to the reminder notification server 130 at the time corresponding to the time frame). In some implementations, the network connection condition module 224 determines whether a network connection condition of the user device 120 meets a network connection condition threshold. In some implementations, the network connection condition threshold is an available bandwidth threshold, a connection speed threshold, or a download time threshold. In some implementations, the network connection condition threshold is a type of network connection (e.g., via a cellular network, via a wireless network, etc.). In some implementations, the network connection condition threshold is a cost of the network connection (e.g., more expensive cellular network, less expensive wireless network).

The presentation component 128 includes a reminder notification presentation module 230 and a reminder notification queue updating module 232.

The reminder notification presentation module 230 may present the offline reminder notification 134 for the content item 112 via the user device 120 during the time frame in response to the user engagement state not meeting the user engagement state threshold. The reminder notification presentation module 230 may not present the offline notification 134 for the content item 112 via the user device 120 during the time frame in response to the user engagement state meeting the user engagement state threshold. The reminder notification presentation module 230 may receive (e.g., from the reminder notification server 130) and present (e.g., via the user device 120) an online reminder notification 136 in response to the user device 120 being online (e.g., connected to the reminder notification server 130 via the network 150) during the time frame. The reminder notification presentation module 230 may receive (e.g., from the reminder notification server 130) and present (e.g., via the user device 120) an online reminder notification 136 in response to the user device 120 having a network connection condition that meets a network connection condition threshold during the time frame.

In some implementations, the reminder notification presentation module 230 may prioritize presenting an online reminder notification 136 over presenting an offline reminder notification 134. For example, the reminder notification presentation module 230 may wait until the end of the time frame to present an offline reminder notification 134. The reminder notification presentation module 230 may present the offline reminder notification 134 if an online reminder notification 136 was not presented during the time frame.

In some implementations, the presentation component 128 may send a command or instruction to an operating system to present a notification (e.g., a push notification). In some implementations, the notification may be a banner (e.g., appears for a predetermined amount of time via the user interface). In some implementations, the notification is an alert (e.g., appears on the user interface until the user interacts with the notification). In some implementations, the notification is shown in a notification center or notification tray (e.g., alongside other notifications) via the user device 120. In some implementations, the notification is an icon displayed in conjunction with an application icon (e.g., a badge app icon).

In some implementations, the presentation component 128 may present a notification via an application. In some implementations, the notification is a prompt that covers a portion of the application (e.g., the user cannot engage with other portions of the application until the user interacts with the notification). In some implementations, the notification is displayed in line with other elements of the application and the user can scroll past the notification. In implementations, the application may display a prompt (e.g., advertisement) to download the content item 112, the user may engage with the prompt to download the content item 112, and the presentation component 128 may update the prompt to be a prompt to engage with the content item 112 (e.g., instead of being a prompt to download the content item 112).

In some implementations, the presentation component 128 may determine whether a notification should be presented via the operating system (e.g., push notification) or the application (e.g., in-app notification). For example, if an application is running in the foreground (e.g., the user is currently engaged with the application), the presentation component 128 may present the notification via the application. If the application is not running in the foreground (e.g., the application is not running or is running in the background), the presentation component 128 may send a command or instruction to the operating system to present the notification.

The reminder notification queue updating module 232 may remove the offline reminder notification 134 from the notification queue 127. The reminder notification queue updating module 232 may remove the offline reminder notification 134 from the notification queue 127 in response to presenting a corresponding online reminder notification 136 for the content item 112 during the time frame. The reminder notification queue updating module 232 may remove the offline reminder notification 134 from the notification queue 127 in response to presenting the offline reminder notification 134 for the content item 112 during the time frame. The reminder notification queue updating module 232 may remove the offline reminder notification 134 from the notification queue 127 in response to determining the engagement state meets the user engagement state threshold at a time corresponding to the time frame.

In some implementations, the offline reminder notification 134 may be reoccurring (e.g., may be periodically displayed). For example, a first instance of the offline reminder notification 134 may be displayed at a first point in time and a second instance of the offline reminder notification 134 may be displayed at a second point in time. The reminder notification queue updating module 232 may remove a first instance of the offline reminder notification 134 from the notification queue 127 without removing other instances of the offline reminder notification 134 from the notification queue 127.

Figure 3:
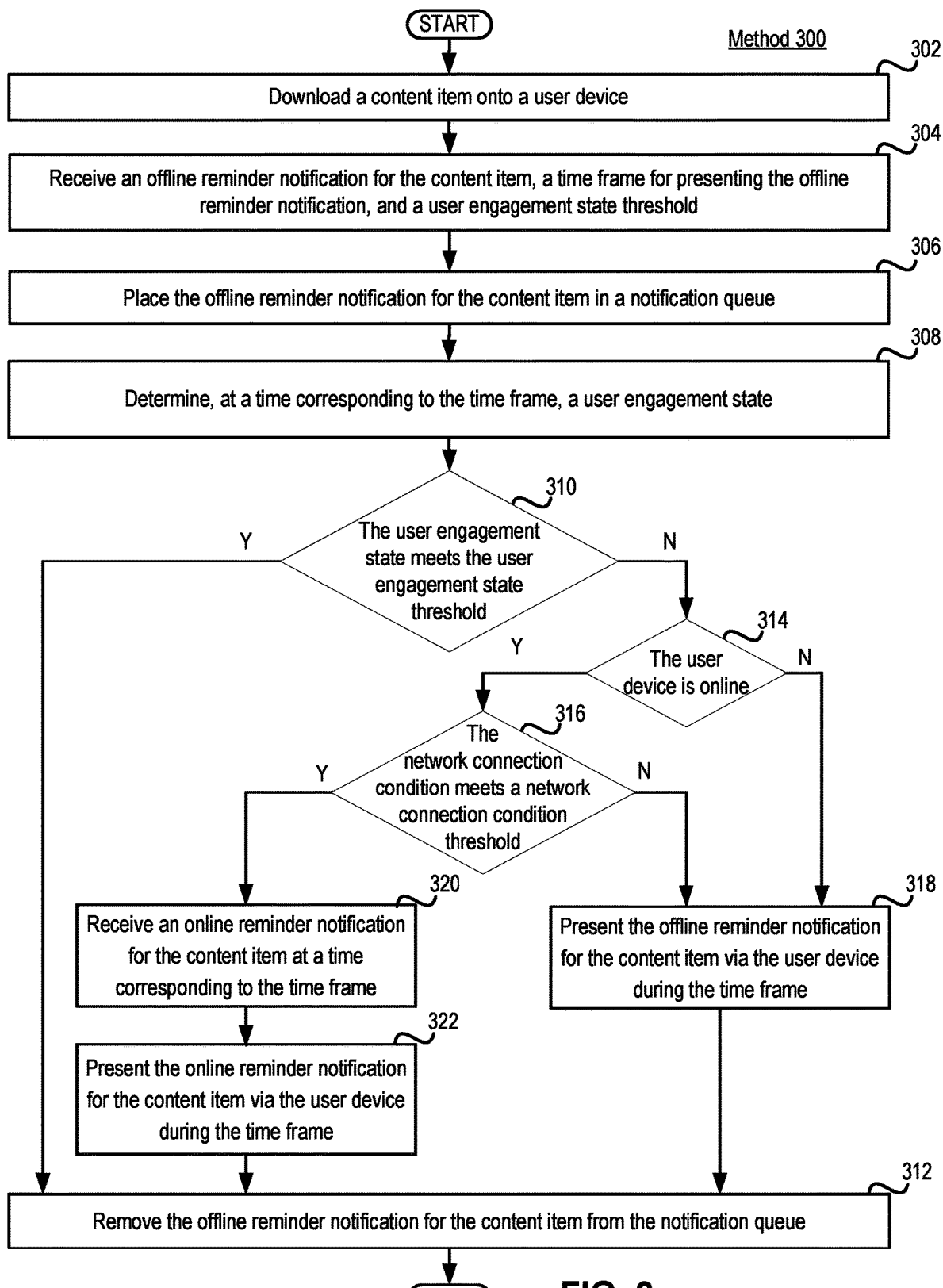
FIG. 3 is a flow diagram illustrating example methods of providing an offline reminder notification, in accordance with an implementation of the disclosure.

FIG. 3 depicts a flow diagram for illustrative examples of method 300 for providing an offline reminder notification via a user device 120. Method 300 is an example method from the perspective of a user device. Method 300 may be performed by processing devices that may include hardware (e.g., circuitry, dedicated logic), software (such as is run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, methods 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of content item server, user device 120, reminder notification server 130, etc.) to perform operations including methods disclosed within. In another example, a system includes a memory to store instructions and a processing device communicably coupled to the memory, the processing device to execute the instructions to perform methods disclosed within. In one implementation, method 300 may be performed by user device 120 of FIG. 1.

Referring to FIG. 3, method 300 may be performed by one or more processing devices of a user device 120 for providing an offline reminder notification 134 via a user device 120. Method 300 may be performed by an application or a background thread executing on one or more processing devices on the user device 120

Method 300 may begin at block 302 where the processing device may download, via a network 150, a content item 112 onto a user device 120. The content item 112 may be accessible offline via the user device 120. For example, the content item 112 may be a video item or audio item and the user device 120 may be able to perform playback of the content item without connection via the network 150 (e.g., without connection to the content item server 110). In another example, the content item 112 may be an application and the user device 120 may be able to execute one or more functionalities of the application without connection via the network 150. In another example, the content item 112 is a contact invitation and the user device 120 may present the contact invitation and receive interaction with the contact invitation without connection via the network 150. In some implementations, a user may perform an interaction (e.g., accept, reject, dismiss, etc.) with the contact invitation via the user device 120 when the user device 120 is offline and the user device 120 may transmit the interaction when the user device is online.

At block 304, the processing device may receive, from server device (e.g., reminder notification server 130) via the network 150, an offline reminder notification 134 for the content item 112, a time frame for presenting the offline reminder notification 134, and a user engagement state threshold. In one example, the offline reminder notification is to be presented via an application (e.g., in-app notification) hosted by the user device 120. In another example, the offline reminder notification is to be presented via an operating system (e.g., push notification) that is executing on the user device 120.

At block 306, the processing device may place the offline reminder notification 134 for the content item 112 in a notification queue 127. The notification queue 127 may include offline reminder notifications 134 for different content items 112. The notification queue may include offline reminder notifications 134 for the same content item 112 (e.g., different instances of the offline reminder notification 134 that are to be periodically displayed).

At block 308, the processing device may determine, at a time corresponding to the time frame, a user engagement state. In some implementations, the user engagement state is in relation to the content item 112. For example, the user engagement state includes a percentage of a content item 112 (e.g., video or audio item) that has been played. In another example, the user engagement state includes the last time the user accessed the content item 112. In another example, the user engagement includes how much time the user has spent interacting with the content item 112. In another example, the user engagement includes a level achieved through the content item 112 (e.g., a level of a game, a chapter read to in an eBook, etc.). In another example, the user engagement includes interaction by the user with the content item 112.

In some implementations, the user engagement state is further in relation to user engagement with the user device 120. For example, the user engagement state may include whether the user device 120 is performing particular interactions (e.g., performing playback of a content item, providing a video conference, providing a telephone call, etc.).

At block 310, the processing device may determine whether the user engagement state meets the user engagement state threshold. In some implementations, the user engagement state threshold may be specific to the type of content item 112. For example, the user engagement state threshold may be an amount of time since last user access for content items 112 that are applications. In another example, the user engagement state threshold may be a percentage of the content item 112 that has been played for content items 112 that are a video or audio item. In another example, the user engagement state threshold may be interaction with the content item 112 for content items that are contact invitations. In some implementations, the user engagement threshold may be specific to the content item 112. For example, one content item may have a user engagement state threshold of 25% of the content item being played and another content item may have a user engagement state threshold of 50% of the content item being played.

In response to determining that the user engagement state meets the user engagement state threshold, the method 300 may proceed to block 312 without presenting the offline reminder notification 134 (e.g., remove the offline reminder notification 134 for the content item 112 from the notification queue 127 without presenting the offline reminder notification 134 for the content item 112 via the user device 120). The user device 120 may transmit an indication to the reminder notification server 130 (e.g., when the user device 120 is online) that the user engagement state for the content item 112 meets the user engagement state threshold. In some implementations, the reminder notification server 130 may not transmit offline reminder notifications 134 or online reminder notifications 136 for the content item 112 to the user device 120 in response to receiving the indication (e.g., if the user engagement state threshold is whether the user has interacted with the contact invitation). In some implementations, the reminder notification server 130 may wait a threshold amount of time before transmitting offline reminder notifications 134 or online reminder notifications 136 for the content item 112 to the user device 120 in response to receiving the indication (e.g., if the user engagement state threshold is whether the user has accessed the application within a threshold amount of time). In some implementations, the reminder notification server 130 transmits an offline reminder notification 134 for the content item 112 with a time frame that has been updated per the indication.

In some implementations, the processing device may determine that the user engagement with the content item 112 does not meet the user engagement state threshold, but the user engagement with the user device 120 does meet the user engagement state threshold. The processing device may present the offline reminder notification 134 after the user engagement with the user device 120 does not meet the user engagement state threshold and then proceed to block 312.

Returning to block 310, in response to determining that the user engagement state does not meet the user engagement state threshold, the method 300 may proceed to block 314 (or may proceed to block 318). At block 314, the processing device may determine whether the user device 120 is online. For example, the processing device may determine whether the user device 120 is connected to the server device (e.g., reminder notification server 130) via the network 150 at the time corresponding to the time frame. The processing device may attempt to connect with the reminder notification server 130 via the network 150 periodically during the time frame (e.g., periodically attempt to send requests to the reminder notification server 130) until a response is received from the reminder notification server 130 via the network 150 or the time frame comes to an end. In response to determining the user device 120 is online, the method may proceed to block 316. In response to determining the user device 120 is offline (e.g., in response to determining the network connection condition of the user device 120 does not meet the network connection condition threshold), the method may proceed to block 318.

At block 316, the processing device may determine whether a network connection condition of the user device 120 meets a network connection condition threshold. In some implementations, the processing device may perform a network speed test (e.g., based on sending a request to the reminder notification server 130 and receiving a response from the reminder notification server 130). The processing device may determine whether the determined network speed meets a network connection condition threshold. In some implementations, the processing device may determine a type of network connection (e.g., cellular connection, wireless connection, etc.) via the network 150. The processing device may determine whether the type of network connection meets the network connection condition threshold. In response to determining that a network connection condition of the user device 120 via the network 150 at the time corresponding to the time frame does not meet a network connection condition threshold, the method 300 may proceed to block 318.

At block 318, the processing device may present the offline reminder notification 134 (e.g., notification 402A of FIG. 4) for the content item 112 via the user device 120 during the time frame. In some implementations, the processing device may present the offline reminder notification 134 via an application. In some implementations, the processing device may present the offline reminder notification 134 via an operating system executing on the user device 120. After block 318, method 300 may proceed to block 312.

In one implementation, the content item 112 is a video or audio item, the user engagement state meeting the user engagement state threshold comprises a percentage of the content item 112 that has been played by a user of the user device meeting a threshold percentage, and the offline reminder notification 134 is a content item playback reminder. In another implementation, the content item 112 is an application, the user engagement state meeting the user engagement state threshold comprises the user having accessed the application within a threshold amount of time, and the offline reminder notification 134 is an access reminder for the application. In another implementation, the content item 112 is a contact invitation, the user engagement state meeting the user engagement state threshold comprises the user having interacted with the contact invitation, and the offline reminder notification 134 is a contact invitation reminder.

In one implementation, the user engagement state is not only based on the user engagement with the content item 112 but also on user engagement with the user device 120. In this implementation, the method 300 further includes determining, at the time corresponding to the time frame, the user engagement with the user device 120. Determining the user engagement state (e.g., block 308) may include determining the user engagement with the content item 112 and the user engagement with the user device 120. Determining whether the user engagement state meets the user engagement state threshold (e.g., block 310) may also include determining whether a device engagement level of the user with the user device 120 meets a device engagement level threshold. A device engagement level may represent a current level of user interaction with the user device 120 (e.g., current activity via the user device 120), and a device engagement level threshold may represent a predefined level of user interaction with a user device 120 (e.g., audio output via the user device 120, playback of a video or audio item via the user device 120, providing a video conference via the user device 120, providing telephone conversation via the user device 120, etc.). In one implementation, the method 300 further includes, in response to determining the device engagement level of the user meets the device engagement level threshold, delaying presentation of the offline reminder notification 134 for the content item 112 via the user device 120 until the device engagement level of the user no longer meets the device engagement level threshold.

In one implementation, a set of content items 112 are downloaded via the network 150 onto the user device 120, the set of content items 112 are accessible offline via the user device 120, and the offline reminder notification 134 is displayed for the set of content items 112 (e.g., an offline mix tape).

Returning to block 316, in response to determining the network connection condition of the user device 120 meets the network connection condition threshold, the method may proceed to block 320. At block 320, the processing device may receive an online reminder notification 136 for the content item 112 (e.g., from the reminder notification server 130) at a time corresponding to the time frame. In some implementations, the online reminder notification 136 may be an updated version of the offline reminder notification 134. In some implementations, the processing device may transmit a request for an online reminder notification 136 to the reminder notification server 130. If an online reminder notification 136 is not received from the reminder notification server 130 prior to the end of the time frame (e.g., the request times out), method 300 may proceed to block 318. For example, the reminder notification server 130 may transmit a response that the reminder notification server 130 does not have an online reminder notification 136 (e.g., does not have updates to the offline reminder notification 134) for the content item 112.

At block 322, the processing device may present the online reminder notification 136 for the content item 112 via the user device during the time frame. After block 324, method 300 may proceed to block 312.

At block 312, the processing device may remove the offline reminder notification 134 for the content item 112 from the notification queue 127. In some implementations, the offline reminder notification 134 is a reoccurring notification (e.g., is periodically displayed). Block 312 may remove a first instance of the offline reminder notification 134 from the notification queue 127. Method 300 may be performed for each instance of the offline reminder notification 134.

Figure 4:
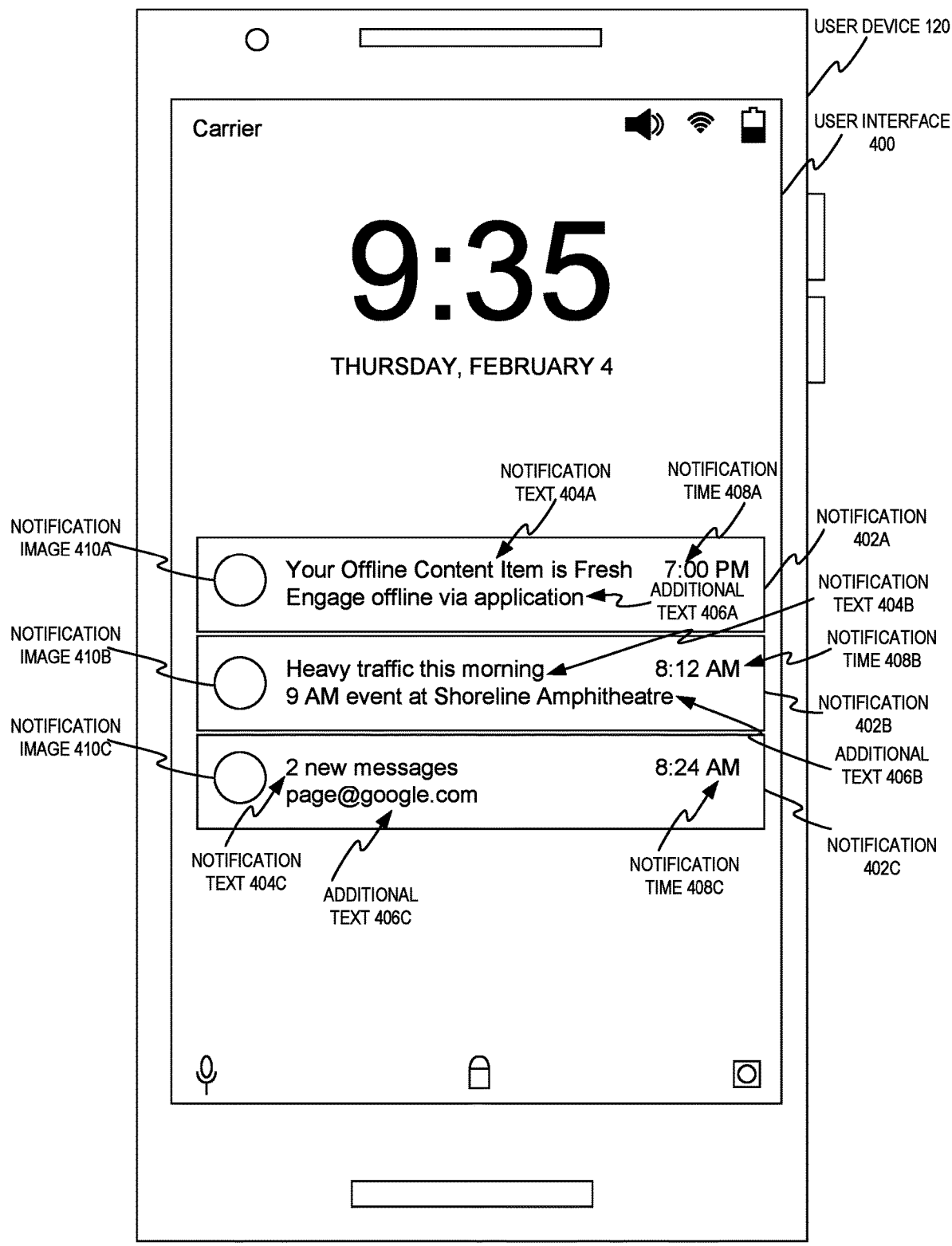
FIG. 4 is an example graphical interface displaying an offline reminder notification, in accordance with an implementation of the disclosure.

Presentation of an offline reminder notification 134, according to some implementations, is further described in relation to FIG. 4.

FIG. 4 illustrates an example graphical interface for a user device 120 displaying an offline reminder notification 134.

Referring to FIG. 4, a user device 120 may display a user interface 400. The user interface 400 displays notifications 402A-402C (hereinafter notification 402). Each notification 402 may include one or more of a graphical, textual, audio, video, tactile, or other component. Each notification 402 may display one or more of notification text 404, additional text 406, notification time 408, notification image 410, and participant image 412. Each notification 402 may be one or more of an offline reminder notification 134 of a content item 112, an online reminder notification 136 of a content item 112, a travel alert, an email alert, etc. Notification 402A may be an offline reminder notification 134 of a content item 112. The notification text 404A may give a description of the livestream video (e.g., "Your Offline Content Item is Fresh"), the additional text 406A may indicate an action that may be taken (e.g., "Engage offline via application"), the notification time 408A may indicate when the notification 402A was sent (e.g., 7:00 PM), and notification image 410A may display an image corresponding to the content item 112 or an application that hosts the content item 112.

In some implementations, the user device 120 may download, via network 150, video or audio items (e.g., an offline mix tape) onto the user device 120 that are accessible offline via the user device 120. The user device 120 may receive, from the reminder notification server 130 via the network 150, an offline reminder notification 134 (e.g., "Your Offline Content Item is Fresh") for the video or audio items, a time frame (e.g., 6:55 PM to 7:00 PM) for presenting the offline reminder notification 134, and a user engagement state threshold. The user device 120 may place the offline reminder notification 134 in a notification queue 127. The user device 120 may determine at a time corresponding to the time frame (e.g., 6:55 PM), a user engagement state in relation to the content item (e.g., user has performed playback of 0-5% of each of the video or audio items). The user device 120 may determine the user engagement state does not meet the user engagement state threshold (e.g., 0-5% does not meet the user engagement state threshold of 25%). In response to determining the user engagement state does not meet the user engagement state threshold, the user device 120 presents a notification 402A for the video or audio items.

The user device 120 may determine whether the user device 120 is online. If the user device 120 is online, the user device 120 may determine whether the network connection condition of the user device 120 meets a network connection condition threshold. In response to determining the user device 120 is offline or the network connection condition does not meet the network connection condition threshold, the notification 402A is presented as an offline reminder notification 134. In response to determining the user device is online or the network connection condition meets the network connection condition threshold, the notification 402A is presented as an online reminder notification 136.

A user may dismiss one or more notifications 402 from the user interface by providing some input (e.g., swiping the notification to the left, selecting a close or dismiss option in the notification, etc.). A user may accept one or more notifications 402 by providing some input (e.g., swiping the notification to the right, selecting a link in the notification to engage offline via an application, selecting an accept option in the notification, etc.). If the user has not dismissed or accepted the notification 402, the notification 402 may be invalidated and replaced by an updated, deduped, or combined notification (e.g., a second instance of an offline reminder notification 134, a second instance of an online reminder notification 136).

Figure 5:
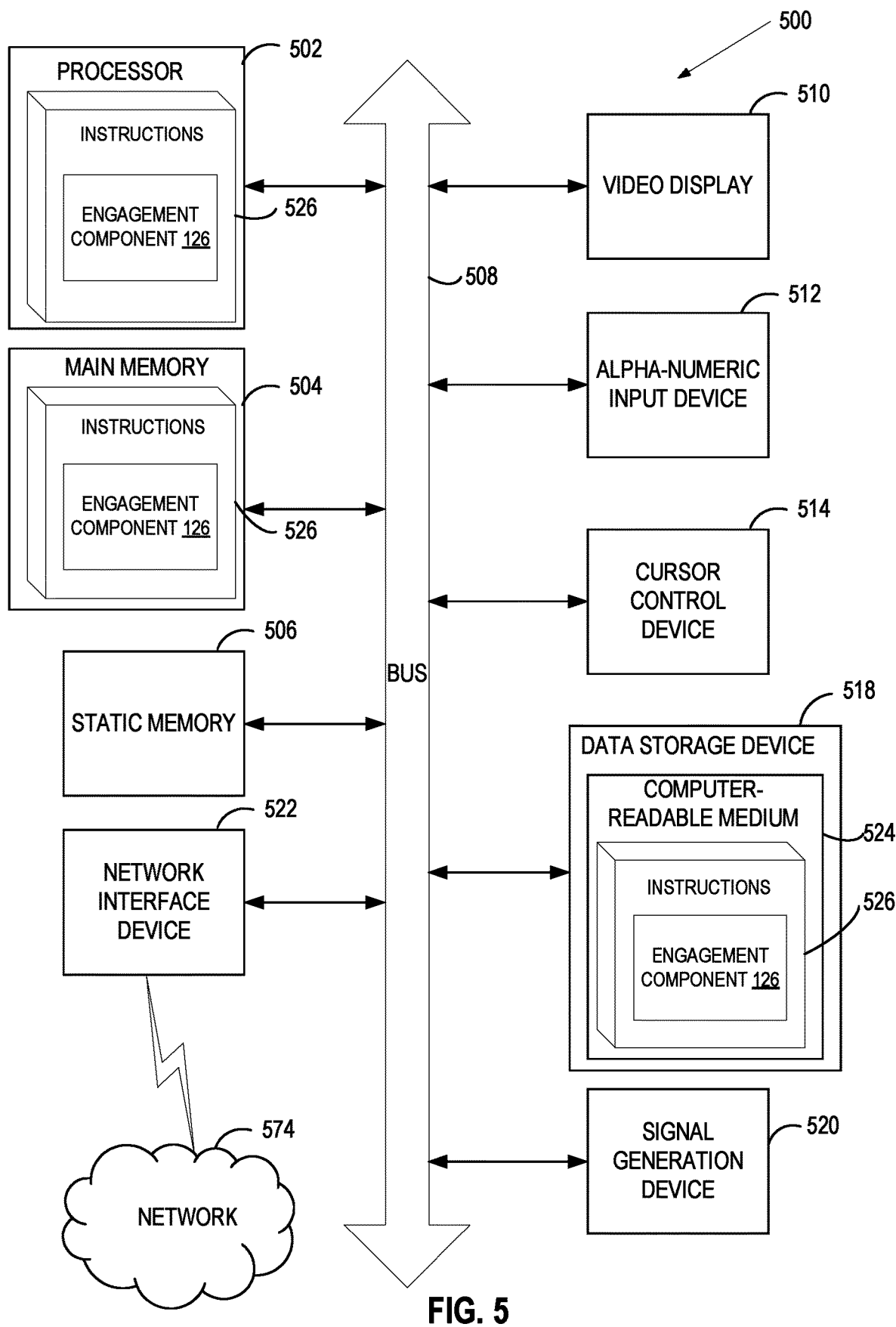
FIG. 5 is a block diagram illustrating one implementation of a computer system, in accordance with an implementation of the disclosure.

FIG. 5 is a block diagram illustrating one implementation of a computer system, in accordance with an implementation of the disclosure. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions encoding the engagement component 126 of FIG. 1 and for implementing method 300.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "downloading," "receiving," "placing," "determining," "presenting," "removing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:

downloading, by a user device via a network, a content item onto the user device, wherein the content item is accessible offline via the user device;

receiving, by the user device from a server device via the network, an offline reminder notification for the content item, a time frame for presenting the offline reminder notification via the user device, and a user engagement state threshold, wherein the offline reminder notification for the content item is presentable offline via the user device based on one or more user engagement states that are in relation to the content item that is accessible offline;

placing, by the user device, the offline reminder notification for the content item in a notification queue on the user device;

determining, by the user device at a time corresponding to the time frame, a user engagement state in relation to the content item;

determining, by the user device, whether the user engagement state meets the user engagement state threshold;

in response to determining that the user engagement state does not meet the user engagement state threshold, presenting, by the user device, the offline reminder notification for the content item via the user device during the time frame; and removing, by the user device, the offline reminder notification from the notification queue on the user device responsive to the presenting of the offline reminder notification for the content item via the user device.

2. The method of claim 1 further comprising, in response to determining that the user engagement state meets the user engagement state threshold, removing the offline reminder notification for the content item from the notification queue without presenting the offline reminder notification for the content item via the user device.

3. The method of claim 1, further comprising:
prior to presenting the offline reminder notification for the content item via the user device, determining that the user device is not connected to the server device via the network at the time corresponding to the time frame.

4. The method of claim 1, further comprising:
prior to presenting the offline reminder notification for the content item via the user device, determining that a network connection condition of the user device via the network at the time corresponding to the time frame does not meet a network connection condition threshold.

5. The method of claim 1, wherein the content item is a video or audio item, the user engagement state meeting the user engagement state threshold comprises a percentage of the content item that has been played by a user of the user device meeting a threshold percentage, and the offline reminder notification is a content item playback reminder.

6. The method of claim 1, wherein the content item is an application, the user engagement state meeting the user engagement state threshold comprises the user having accessed the application within a threshold amount of time, and the offline reminder notification is an access reminder for the application.

7. The method of claim 1, wherein the content item is a contact invitation, the user engagement state meeting the user engagement state threshold comprises the user having interacted with the contact invitation, and the offline reminder notification is a contact invitation reminder.

8. The method of claim 1 further comprising determining, at the time corresponding to the time frame, user engagement with the user device, wherein the user engagement state is further determined in relation to the user engagement with the user device, wherein the user engagement state meeting the user engagement state threshold comprises a device engagement level of the user with the user device meeting a device engagement level threshold.

9. The method of claim 8 further comprising, in response to determining the device engagement level of the user meets the device engagement level threshold, delaying presentation of the offline reminder notification for the content item via the user device until the device engagement level of the user does not meet the device engagement level threshold.

10. The method of claim 1, wherein:
a set of content items are downloaded via the network onto the user device;
the set of content items are accessible offline via the user device; and
the offline reminder notification is displayed for the set of content items.

11. A non-transitory machine-readable storage medium storing instructions which, when executed cause a processing device of a user device to perform operations comprising:

downloading, via a network, a content item onto the user device, wherein the content item is accessible offline via the user device;

receiving, from a server device via the network, an offline reminder notification for the content item, a time frame for presenting the offline reminder notification via the user device, and a user engagement state threshold, wherein the offline reminder notification for the content item is presentable offline via the user device based on one or more user engagement states that are in relation to the content item that is accessible offline;

placing the offline reminder notification for the content item in a notification queue on the user device;

determining, at a time corresponding to the time frame, a user engagement state in relation to the content item;

determining whether the user engagement state meets the user engagement state threshold;

in response to determining that the user engagement state does not meet the user engagement state threshold, presenting the offline reminder notification for the content item via the user device during the time frame; and removing the offline reminder notification from the notification queue on the user device responsive to the presenting of the offline reminder notification for the content item via the user device.

12. The non-transitory machine-readable storage medium of claim 11, wherein the operations further comprise, in response to determining that the user engagement state meets the user engagement state threshold, removing the offline reminder notification for the content item from the notification queue without presenting the offline reminder notification for the content item via the user device.

13. The non-transitory machine-readable storage medium of claim 11, wherein the operations further comprise, prior to presenting the offline reminder notification for the content item via the user device, determining that the user device is not connected to the server device via the network at the time corresponding to the time frame.

14. The non-transitory machine-readable storage medium of claim 11, wherein the content item is a video or audio item, the user engagement state meeting the user engagement state threshold comprises a percentage of the content item that has been played by a user of the user device meeting a threshold percentage, and the offline reminder notification is a content item playback reminder.

15. The non-transitory machine-readable storage medium of claim 11, wherein the content item is an application, the user engagement state meeting the user engagement state threshold comprises the user having accessed the application within a threshold amount of time, and the offline reminder notification is an access reminder for the application.

16. A system comprising:
a memory to store instructions; and
a processing device communicably coupled to the memory, the processing device to execute the instructions to:

download, via a network, a content item onto a user device, wherein the content item is accessible offline via the user device;

receive, from a server device via the network, an offline reminder notification for the content item, a time frame for presenting the offline reminder notification via the user device, and a user engagement state threshold, wherein the offline reminder notification for the content item is presentable offline via the user device based on one or more user engagement states that are in relation to the content item that is accessible offline;

place the offline reminder notification for the content item in a notification queue of the user device;

determine, at a time corresponding to the time frame, a user engagement state in relation to the content item;

determine whether the user engagement state meets the user engagement state threshold;

in response to determining that the user engagement state does not meet the user engagement state threshold, present the offline reminder notification for the content item via the user device during the time frame; and removing the offline reminder notification from the notification queue on the user device responsive to the presenting of the offline reminder notification for the content item via the user device.

17. The system of claim 16, wherein the processing device is further to, in response to determining that the user engagement state meets the user engagement state threshold, remove the offline reminder notification for the content item from the notification queue without presenting the offline reminder notification for the content item via the user device.

18. The system of claim 16, wherein the processing device is further to, prior to presenting the offline reminder notification for the content item via the user device, determine that the user device is not connected to the server device via the network at the time corresponding to the time frame.

19. The system of claim 16, wherein the content item is a video or audio item, the user engagement state meeting the user engagement state threshold comprises a percentage of the content item that has been played by a user of the user device meeting a threshold percentage, and the offline reminder notification is a content item playback reminder.

20. The system of claim 16, wherein the content item is an application, the user engagement state meeting the user engagement state threshold comprises the user having accessed the application within a threshold amount of time, and the offline reminder notification is an access reminder for the application.

* * * * *